(12) United States Patent
Higashitani et al.

(10) Patent No.: US 8,217,378 B2
(45) Date of Patent: Jul. 10, 2012

(54) LUMINESCENT IMAGE READING DEVICE AND IMAGE FORMING APPARATUS

(75) Inventors: Masahiro Higashitani, Osaka (JP); Kei Ouchi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 379 days.

(21) Appl. No.: 12/503,463

(22) Filed: Jul. 15, 2009

(65) Prior Publication Data

US 2010/0012852 A1    Jan. 21, 2010

(30) Foreign Application Priority Data

Jul. 17, 2008  (JP) ................................. 2008-186419

(51) Int. Cl.
*H01J 40/14* (2006.01)
*H04N 1/04* (2006.01)
(52) U.S. Cl. .................. 250/578.1; 358/474
(58) Field of Classification Search .................. 250/216, 250/478; 358/474, 475, 479, 484, 509
See application file for complete search history.

(56) References Cited

U.S. PATENT DOCUMENTS 7,755,811 B2 * 7/2010 Herloski et al. ............. 358/475
2006/0279961 A1 * 12/2006 Sakurai ....................... 362/555

FOREIGN PATENT DOCUMENTS

JP   2002-314760   10/2002
JP   2008-035036    2/2008

* cited by examiner

*Primary Examiner* — Georgia Y Epps
*Assistant Examiner* — Renee Naphas
(74) *Attorney, Agent, or Firm* — Hoffmann & Baron, LLP

(57) ABSTRACT

The present invention aims at providing an image reading device and an image forming apparatus including a light guiding body having a first emission surface and a second emission surface. A color copy machine includes a luminescence portion including: LEDs composed of a plurality of dot-shaped luminescence members disposed at predetermined intervals in a main scanning direction and/or an elongated luminescence member that is formed to extend in the main scanning direction; and a light guiding body that is disposed between the LEDs and an original, and has a light incidence portion disposed on a side to the LEDs and an emission portion disposed on a side to the original. The emission portion has a first emission surface and a second emission surface that is formed on a different plane from a plane including the first emission surface.

18 Claims, 9 Drawing Sheets

LUMINESCENT IMAGE READING DEVICE AND IMAGE FORMING APPARATUS

CROSS-REFERENCE TO RELATED APPLICATIONS

This application is based on and claims the benefit of priority from Japanese Patent Application No. 2008-186419, filed on 17 Jul. 2008, the content of which is incorporated herein by reference.

FIELD OF THE INVENTION

The present invention relates to an image reading device and an image forming apparatus including an image reading device.

BACKGROUND OF THE INVENTION

Conventionally, an image reading device for reading an image on an original has been known, including an illumination portion for irradiating light onto an original, a mirror for reflecting light from the original and forming a light path, an imaging lens for forming an image from a luminous flux from the original, and a CCD (charge-coupled device) for reading an image of the original formed by the imaging lens.

A light emitting device such as an LED (light-emitting diode) has been recently used, in addition to light emitting members such as a fluorescent lamp and a xenon tube, as a luminescence portion constituting the illumination portion. For example, an image reading device is suggested in which an illumination portion is configured by arranging a plurality of light emitting devices in a main scanning direction (Japanese Unexamined Patent Application Publication No. 2002-314760).

In addition, an image reading device is proposed that includes a light guiding body which guides light from a luminescence portion to a side of an original in order to efficiently utilize the light from the luminescence portion (see Japanese Unexamined Patent Application Publication No. 2008-35036).

SUMMARY OF THE INVENTION

However, the image reading devices disclosed in Japanese Unexamined Patent Application Publication No. 2002-314760 and Japanese Unexamined Patent Application Publication No. 2008-35036 have only one emission surface and thus can emit light only in one direction. For example, in order to guide light toward a reflective member that irradiates light from a direction different from that of direct light from the light guiding body, for suppressing a so-called edge shadow, it is required to dispose a bending member separately from the light guiding body. This may inhibit size reduction of an image reading device.

In addition, since the entire emission surface is planar, a large amount of light is irradiated outside of a valid irradiated area. In other words, the light condensing properties thereof may not be sufficient.

In addition, it may be difficult to adjust the intensity of light that is guided from the emission surface toward an original and the like with a high degree of accuracy.

The present invention aims at providing an image reading device including a light guiding body having a first emission surface and a second emission surface. In addition, the present invention aims at providing an image forming apparatus including the abovementioned image reading device.

The present invention relates to an image reading device including: an illumination portion that irradiates light onto an original, including: a luminescence portion composed of at least one of: a plurality of dot-shaped luminescence members that is disposed at predetermined intervals in a main scanning direction; and an elongated luminescence member that is formed to extend in the main scanning direction, a light guiding body that is disposed between the luminescence portion and the original, and includes: a light incidence portion disposed on a side to the luminescence portion, and a light emission portion including a first emission surface disposed on a side to the original and a second emission surface formed on a different plane from a plane including the first emission surface; at least one mirror that forms a light path by reflecting a luminous flux from the original; an imaging lens that forms an image from the luminous flux reflected by the at least one mirror; and a reading portion that is disposed in an imaging position of the imaging lens, and reads an image of the original based on image formation by the imaging lens.

The present invention relates to an image forming apparatus that includes: an image reading device having: an illumination portion that irradiates light onto an original, including a luminescence portion composed of at least one of: a plurality of dot-shaped luminescence members that is disposed at predetermined intervals in a main scanning direction; and an elongated luminescence member that is formed to extend in the main scanning direction; and a light guiding body that is disposed between the luminescence portion and the original, having a light incidence portion disposed on a side to the luminescence portion, and a light emission portion including a first emission surface disposed on a side to the original and a second emission surface formed on a different plane from a plane including the first emission surface; at least one mirror that forms a light path by reflecting a luminous flux from the original, an imaging lens that forms an image from the luminous flux reflected by the at least one mirror, and a reading portion that is disposed in an imaging position of the imaging lens, and reads an image of the original based on image formation by the imaging lens; an image supporting body on which an electrostatic latent image is formed on a surface thereof based on image information relating to an image of the original that is read by the image reading device; a developing unit that develops a toner image on the electrostatic latent image formed on the image supporting body; a transfer portion that directly or indirectly transfers the toner image formed on the image supporting body to a predetermined paper; and a fixing portion that fixes the toner image transferred to the predetermined paper by the transfer portion.

According to the present invention, an image reading device including a light guiding body having a first emission surface and a second emission surface can be provided. In addition, according to the present invention, an image forming apparatus including the abovementioned image reading device can be provided.

BRIEF DESCRIPTION OF THE DRAWINGS

FIG. 4 is a cross-sectional view illustrating a configuration of an illumination portion 347a;

DETAILED DESCRIPTION OF THE INVENTION

A preferred embodiment of the present invention is described hereinafter with reference to the drawings.

First, a first embodiment of the present invention is described with reference to FIGS. 1 to 6.

Figure 1:
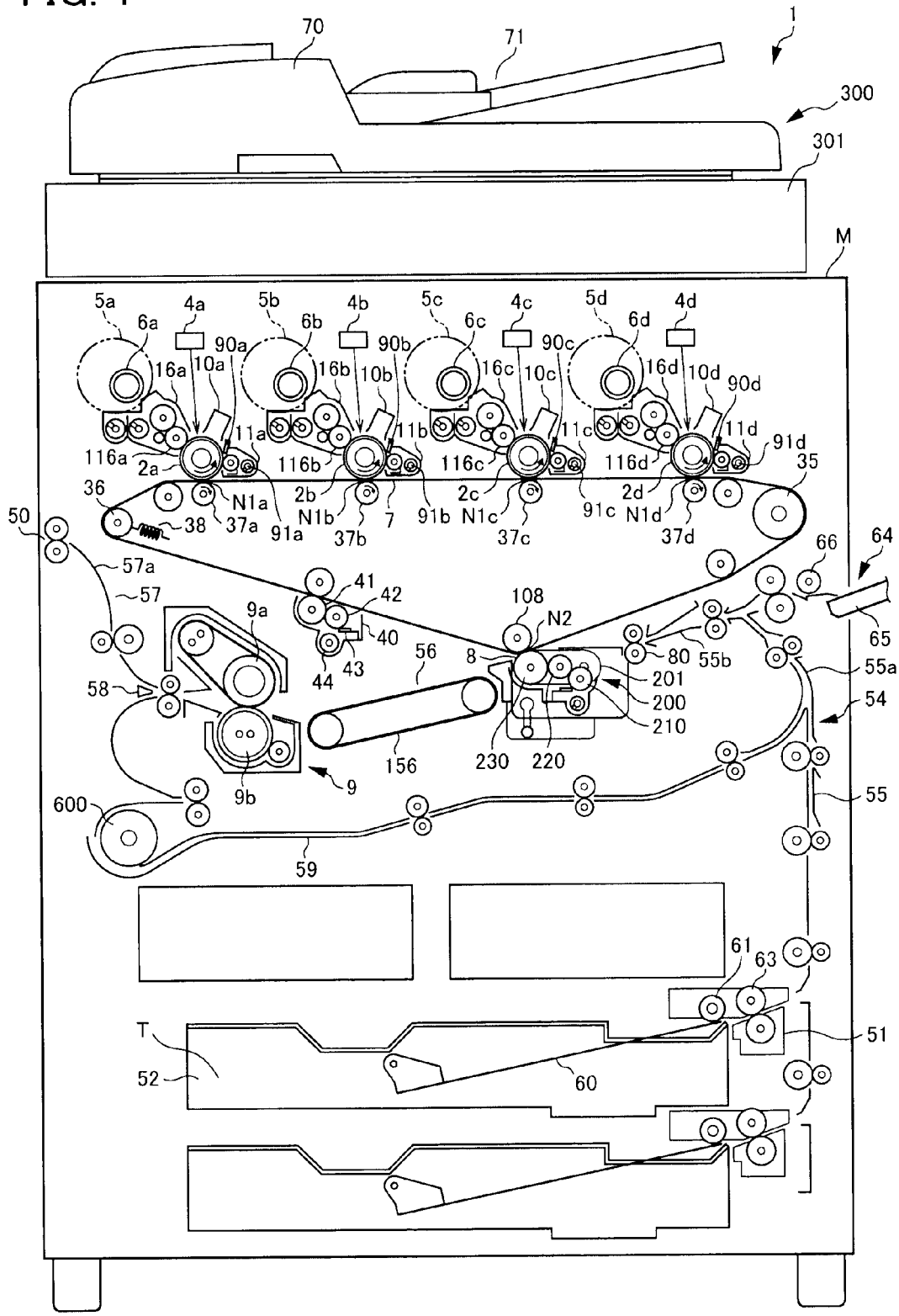
FIG. 1 is a left lateral view illustrating an arrangement of components of the color copy machine 1.

An overall structure of a color copy machine 1 as an image forming apparatus according to the first embodiment is described referring to FIG. 1. FIG. 1 is a left lateral view showing an arrangement of components of the color copy machine 1. In the present embodiment, a side on which a manual feeding tray 65 (described later) is disposed (a right side in FIG. 1) is a front side of the color copy machine 1.

The color copy machine 1 as the image forming apparatus includes: an image reading device 300 disposed on an upper side thereof, and a device main body M disposed on a lower side thereof that forms a toner image on a paper T on the basis of image information from the image reading device 300.

The image reading device 300 includes an original feeder portion 70 for feeding a predetermined original G (see FIG. 2), and a reader portion 301 for reading an image of the original G. The original feeder portion 70 is connected with the reader portion 301 by means of a connecting portion (not shown) so as to be openable and closable. The original feeder portion 70 also protects a reading surface 302A (see FIG. 3).

In a case where the original feeder portion 70 is closed, the original G is placed on an original support portion 71 provided on an upper face of the original feeder portion 70. The original G placed on the original support portion 71 is fed by a feeding roller (not shown) to a first reading surface 303A (see FIG. 3) constituting the reading surface 302A in the reader portion 301. In this case, an illumination unit 347 and a mirror unit 349 (see FIG. 3), described later, are fixed to a first position 303 (see FIG. 3). Then, the original G is slid through the first reading surface 303A and a CCD 358 (see FIG. 3), as an image reader portion, reads an image on a surface of the original G.

In a case where the original feeder portion 70 is opened, the original G is placed on a second reading surface 304A (see FIG. 3) constituting the reading surface 302A. In this case, the illumination unit 347 and the mirror unit 349 are placed in a second position 304 (see FIG. 3) and moved in a sub-scanning direction X within the second position 304. The illumination unit 347 and the mirror unit 349 are moved while maintaining a constant length of a light path H described later (see FIG. 3) (light path length). This allows a CCD 358 (see FIG. 3), as an image reader portion, to read an image on a surface of the original G. The reader portion 301 of the image reading device 300 is described later in detail.

The device main body M includes: photoreceptor drums 2*a*, 2*b*, 2*c*, and 2*d* as image supporting bodies; charging portions 10*a*, 10*b*, 10*c*, and 10*d*; laser scanner units 4*a*, 4*b*, 4*c*, and 4*d*; developing units 16*a*, 16*b*, 16*c*, and 16*d*; toner cartridges 5*a*, 5*b*, 5*c*, and 5*d*; toner feeding devices 6*a*, 6*b*, 6*c*, and 6*d*; an intermediate transfer belt 7; primary transfer rollers 37*a*, 37*b*, 37*c*, and 37*d*; an intermediate transfer unit 200 including a secondary transfer roller 8; and a fixing device 9. The device main body M further includes a paper feeding cassette 52 disposed to be slidable on a lower side of the device main body M, in which the paper T is housed in a state of being stacked. In addition, the device main body M includes a paper path 54 on which the paper T dispatched from the paper feeding cassette 52 is conveyed.

The photoreceptor drums 2*a*, 2*b*, 2*c*, and 2*d* are cylindrically shaped members. The photoreceptor drums 2*a*, 2*b*, 2*c*, and 2*d* are disposed in a rotatable manner on an axis that is vertical with respect to a paper surface of FIG. 1. An electrostatic latent image is formed on a surface of each of the photoreceptor drums 2*a*, 2*b*, 2*c*, and 2*d*.

The charging portions 10*a*, 10*b*, 10*c*, and 10*d* are disposed vertically above the photoreceptor drums 2*a*, 2*b*, 2*c*, and 2*d*. The charging portions 10*a*, 10*b*, 10*c*, and 10*d* uniformly positively charge (straight polarity) the surface of the photoreceptor drums 2*a*, 2*b*, 2*c*, and 2*d*, respectively.

The laser scanner units 4*a*, 4*b*, 4*c*, and 4*d* are disposed vertically above the photoreceptor drums 2*a*, 2*b*, 2*c*, and 2*d* respectively, spaced apart therefrom. The laser scanner units 4*a*, 4*b*, 4*c*, and 4*d* are configured each including a laser light source, a polygon mirror, a polygon mirror driving motor and the like, which are not shown.

The laser scanner units 4*a*, 4*b*, 4*c*, and 4*d* scan and expose the surface of the photoreceptor drums 2*a*, 2*b*, 2*c*, and 2*d* respectively, based on image information read by the reader portion 301. By being scanned and exposed by the laser scanner units 4*a*, 4*b*, 4*c*, and 4*d*, an electric charge charged onto the surface of the photoreceptor drums 2*a*, 2*b*, 2*c*, and 2*d* is removed respectively. In this way, an electrostatic latent image is formed on a surface of each of the photoreceptor drums 2*a*, 2*b*, 2*c*, and 2*d*.

The developing units 16*a*, 16*b*, 16*c*, and 16*d* are disposed beside the photoreceptor drums 2*a*, 2*b*, 2*c*, and 2*d* (on the left side of FIG. 1). The developing units 16*a*, 16*b*, 16*c*, and 16*d* each develop a toner image of each color on the electrostatic latent image formed on the photoreceptor drums 2*a*, 2*b*, 2*c*, and 2*d*. The developing units 16*a*, 16*b*, 16*c*, and 16*d* correspond to the four toner colors of yellow, cyan, magenta, and black. The developing units 16*a*, 16*b*, 16*c*, and 16*d* are configured to include developing rollers 116*a*, 116*b*, 116*c*, and 116*d* that can be disposed facing the photoreceptor drums 2*a*, 2*b*, 2*c*, and 2*d*, and stirring rollers for stirring toners, respectively.

The toner cartridges 5*a*, 5*b*, 5*c*, and 5*d* store toners of the colors that are supplied to the developing units 16*a*, 16*b*, 16*c*, and 16*d*, respectively. The toner cartridges 5*a*, 5*b*, 5*c*, and 5*d* store toners of yellow, cyan, magenta, and black respectively.

The toner feeding devices 6*a*, 6*b*, 6*c*, and 6*d* supply the toners of the colors stored in the toner cartridges 5*a*, 5*b*, 5*c*, and 5*d* to the developing units 16*a*, 16*b*, 16*c*, and 16*d*, respectively.

Toner images of respective colors developed on the photoreceptor drums 2*a*, 2*b*, 2*c*, and 2*d* are sequentially transferred to the intermediate transfer belt 7. The intermediate transfer belt 7 is disposed to be stretched around a driving roller 35 and a tension roller 36. Since the tension roller 36 is spring biased away from the driving roller 35 by a spring 38, a predetermined tension is applied to the intermediate transfer belt 7.

The primary transfer rollers 37*a*, 37*b*, 37*c*, and 37*d* are disposed across the intermediate transfer belt 7 from the photoreceptor drums 2*a*, 2*b*, 2*c*, and 2*d*.

Predetermined portions of the intermediate transfer belt 7 are sandwiched between the primary transfer rollers 37*a*, 37*b*, 37*c*, and 37*d* and the photoreceptor drums 2*a*, 2*b*, 2*c*, and 2*d*. The predetermined portions being sandwiched are pressed against surfaces of the photoreceptor drums 2*a*, 2*b*, 2*c*, and 2*d*. Primary transfer nips N1*a*, N1*b*, N1*c*, and N1*d* are thus formed. Then, the toner images of the colors developed on the photoreceptor drums 2a, 2b, 2c, and 2d are sequentially transferred to the intermediate transfer belt 7. A full-color toner image is thus formed on the intermediate transfer belt 7.

A primary transfer bias, for transferring the toner images of the colors developed on the photoreceptor drums 2a, 2b, 2c, and 2d to the intermediate transfer belt 7 respectively, is applied to each of the primary transfer rollers 37a, 37b, 37c, and 37d by a voltage application portion (not shown).

The secondary transfer roller 8 secondarily transfers the toner image, primarily transferred to the intermediate transfer belt 7, to the paper T. A secondary transfer bias for transferring the toner image on the intermediate transfer belt 7 to the paper T is applied to the secondary transfer roller 8, by a voltage application portion (not shown).

The secondary transfer roller 8 can be either in contact with or spaced apart from the intermediate transfer belt 7. More specifically, the secondary transfer roller 8 is configured to be movable between a contacting position that is in contact with the intermediate transfer belt 7 and a spaced position that is spaced apart from the intermediate transfer belt 7. In particular, the secondary transfer roller 8 is moved to the contacting position for transferring the toner image primarily transferred to a surface of the intermediate transfer belt 7 to the paper T, and to the spaced position in all other circumstances. Here, the secondary transfer roller 8 is moved to and away from the intermediate transfer belt 7 by rotational movement of the entire intermediate transfer unit 200.

The secondary transfer roller 8 is included in the intermediate transfer unit 200. The intermediate transfer unit 200 includes: a housing 201 that stores and pivotally supports the secondary transfer roller 8; a rotation driving gear 210 disposed on a lateral face of the housing 201; a roller-side gear 230 disposed on the lateral face of the housing 201 in a direction of a rotational axis of the secondary transfer roller 8; and an idle gear 220 disposed to be in contact with the rotation driving gear 210 and the roller-side gear 230. The intermediate transfer unit 200 is rotationally moved on a rotational axis (not shown) by an attaching/detaching portion (not shown), between a position where the secondary transfer roller 8 can be in contact with the intermediate transfer belt 7 and a position where the secondary transfer roller 8 is not in contact with the intermediate transfer belt 7.

An opposing roller 108 is disposed across the intermediate transfer belt 7 from the secondary transfer roller 8. A predetermined portion of the intermediate transfer belt 7 is sandwiched between the secondary transfer roller 8 and the opposing roller 108. The paper T is pressed against a surface (a side to which the image is primarily transferred) of the intermediate transfer belt 7. A secondary transfer nip N2 is thus formed and the toner image primarily transferred to the intermediate transfer belt 7 is transferred to the paper T.

The fixing device 9 fuses and fixes color toners constituting the toner image secondarily transferred to the paper T. The fixing device 9 includes a heating roller 9a that is heated by a heater, and a pressurizing roller 9b that is pressurized contact with the heating roller 9a. The heating roller 9a and the pressurizing roller 9b sandwiches and conveys the paper T to which the toner image is secondarily transferred. The paper T is conveyed in a state of being sandwiched between the heating roller 9a and the pressurizing roller 9b, thereby fusing and fixing the toner transferred thereto.

A belt cleaning device 40 for cleaning the intermediate transfer belt 7 is disposed between the secondary transfer roller 8 and the tension roller 36. The belt cleaning device 40 includes a cleaning brush 41 that contacts to slide on the surface of the intermediate transfer belt 7; a cleaning roller 42 disposed so as to contact the cleaning brush 41; a blade 43 disposed so that a tip thereof contacts a surface of the cleaning roller 42; and a collection spiral 44 disposed below the blade 43.

The paper feeding cassette 52 for housing the paper T is disposed to be horizontally slidable on a lower side of the device main body M in a vertical direction. The paper feeding cassette 52 stores the paper T in a state of being stacked. The paper feeding cassette 52 includes a paper tray 60 on which the paper T is placed. The paper T arranged on the paper tray is dispatched to the paper path 54 by a cassette feeding portion 51 disposed in an end portion of the paper feeding cassette 52 on a side of dispatching the paper (in a right end portion of FIG. 1). The cassette feeding portion 51 includes a double feed preventing mechanism composed of: a forward feed roller 61 for picking up the paper T on the paper tray 60; and a roller pair 63 for feeding the paper T one sheet at a time to the paper path 54.

The paper path 54 for conveying the paper T is formed between the cassette feeding portion 51 and an ejection portion 50. The paper path 54 includes: a first paper path 55 from the cassette feeding portion 51 to the secondary transfer roller 8; a second paper path 56 from the secondary transfer roller 8 to the fixing device 9; and a third paper path 57 from the fixing device 9 to the ejection portion 50. A diverter arm 58 is provided at an exit of the fixing device 9. A reverse paper path 59 for returning the paper T to the first paper path 55 is provided between the diverter arm 58 and a curved path 55a (described later) in the first paper path 55.

The first paper path 55 includes the curved path 55a for conveying the paper T, dispatched from the paper feeding cassette 52, vertically upward and changing a conveying direction thereof to leftward in FIG. 1, and a straight path 55b from the curved path 55a to the secondary transfer roller 8. A guide plate and a pair of rollers for guiding and conveying the paper T are disposed in the first paper path 55. In addition, a sensor for detecting the paper T and a resist roller pair 80 for skew compensation of the paper T and timing adjustment with respect to the toner image are disposed in the first paper path 55. The sensor is disposed immediately before the resist roller pair 80 in a conveying direction of the paper T (on an upstream side thereof in the conveying direction). The resist roller pair 80 conveys the paper T while performing the abovementioned compensation and the timing adjustment based on detection information from the sensor.

The second paper path 56 is a straight paper path that is declivitous toward the fixing device 9. A conveyor belt 156 for conveying the paper T placed thereon is disposed in the second paper path 56. In addition, a sensor for detecting the paper T is disposed in a predetermined position on the second paper path 56.

The third paper path 57 is formed to be acclivitous from the exit of the fixing device 9 toward an upper left portion in FIG. 1. The third paper path 57 is configured to include a vertical paper path 57a that is provided on a downstream side of the diverter arm 58 in the conveying direction and formed to be acclivitous. The paper T conveyed on the third paper path 57 passes above the diverter arm 58, and is then conveyed substantially vertically upward. Subsequently, the paper T is ejected from the ejecting portion 50 to the outside of the device main body M. The third paper path 57 is configured to include a guide plate and a pair of rollers for guiding and conveying the paper T, as with other paper paths.

The reverse paper path 59 is formed to branch downward from the diverter arm 58 to an opposite direction to the third paper path 57, pass vertically below the fixing device 9, the second paper path 56, the secondary transfer roller 8 and the resist roller pair 80, and then go vertically upward. The reverse paper path 59 is formed to join the curved path 55a in the first paper path 55. The reverse paper path 59 is a paper path for returning the paper T having passed through the fixing device 9 to an upstream side of the resist roller pair 80 that is disposed on an upstream side of the secondary transfer roller 8. The reverse paper path 59 is a paper path used for duplex printing, in which toner images (including letters and the like) are printed on both sides of the paper T. The paper T is, for example, returned to the first paper path 55 via the reverse paper path 59, in a state of being reversed by a reversing roller 600. The reverse paper path 59 is, as with other paper paths, configured to include a guide plate and a pair of rollers for guiding and conveying the paper T, and includes a sensor for detecting paper in a predetermined position.

The manual feeding portion 64 is provided on the right side of the device main body M in FIG. 1, above the feeding cassette 52. The manual feeding portion 64 includes the manual feeding tray 65, which constitutes a side wall in a closed state, and a feeding roller 66. The manual feeding tray 65 is connected by a lower end thereof so as to be rotatable (openable and closable), in the vicinity of the curved path 55a of the first paper path 55. The manual feeding portion 64 feeds the paper T placed on the manual feeding tray 65 in an open state to the curved path 55a of the first paper path 55.

Next, the reader portion 301 constituting the image reading device 300 is described hereinafter with reference to FIGS. 2 to 6.

Figure 2:
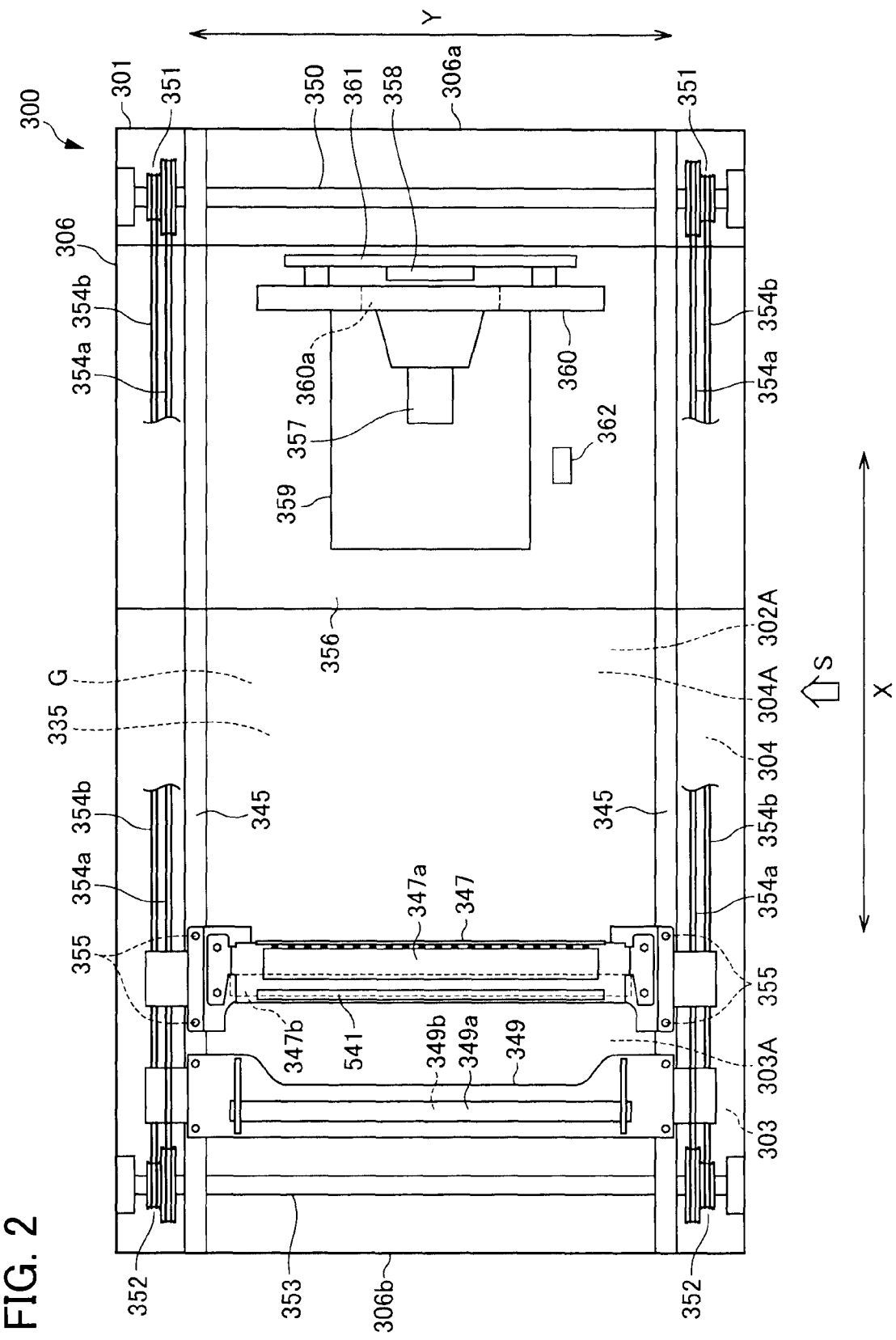
FIG. 2 is a schematic plan view of an internal configuration of a reader portion 301.
Figure 3:
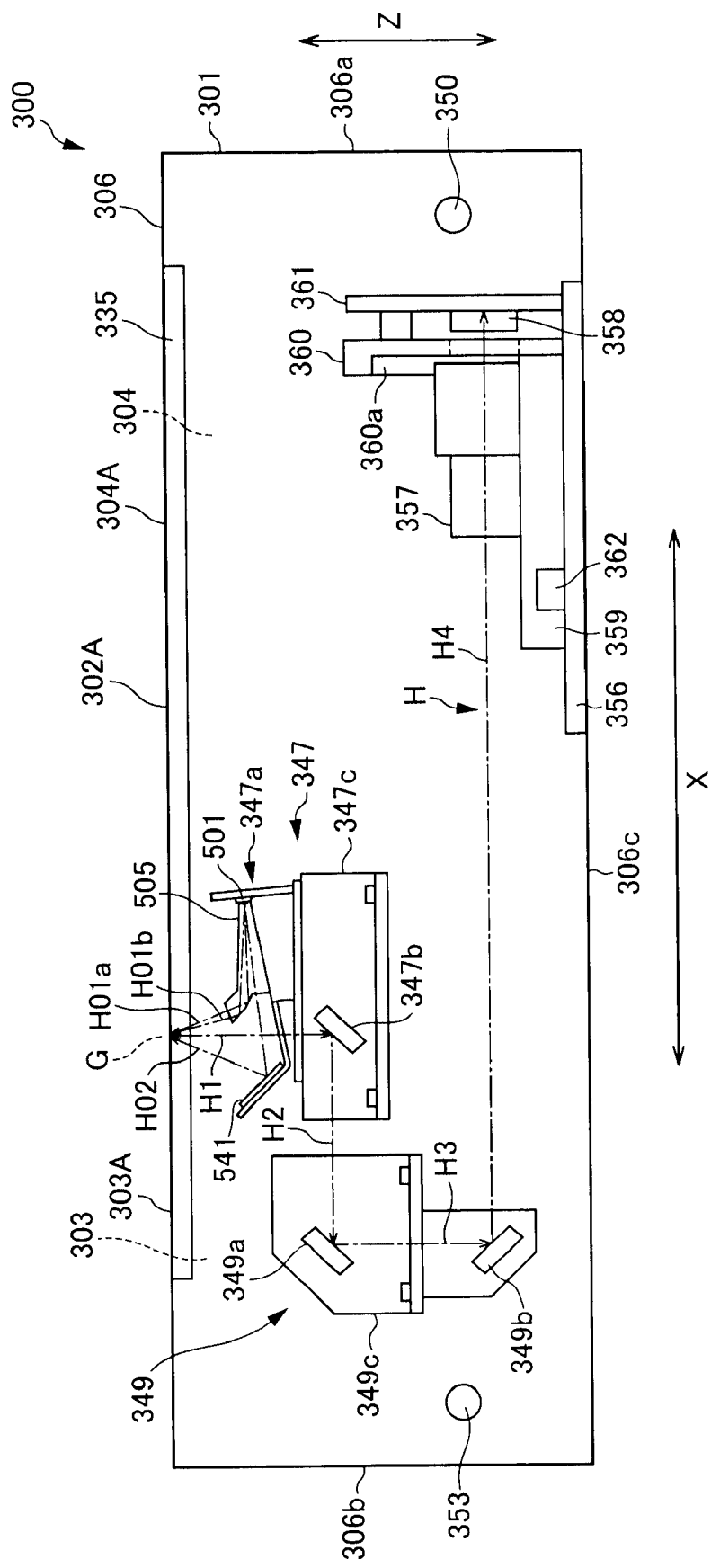
FIG. 3 is a diagram of FIG. 2 viewed from a direction of an arrow S: it should be noted that FIG. 3 is a schematic view, accordingly omitting members shown in FIG. 2 for illustrative purposes.
Figure 4:
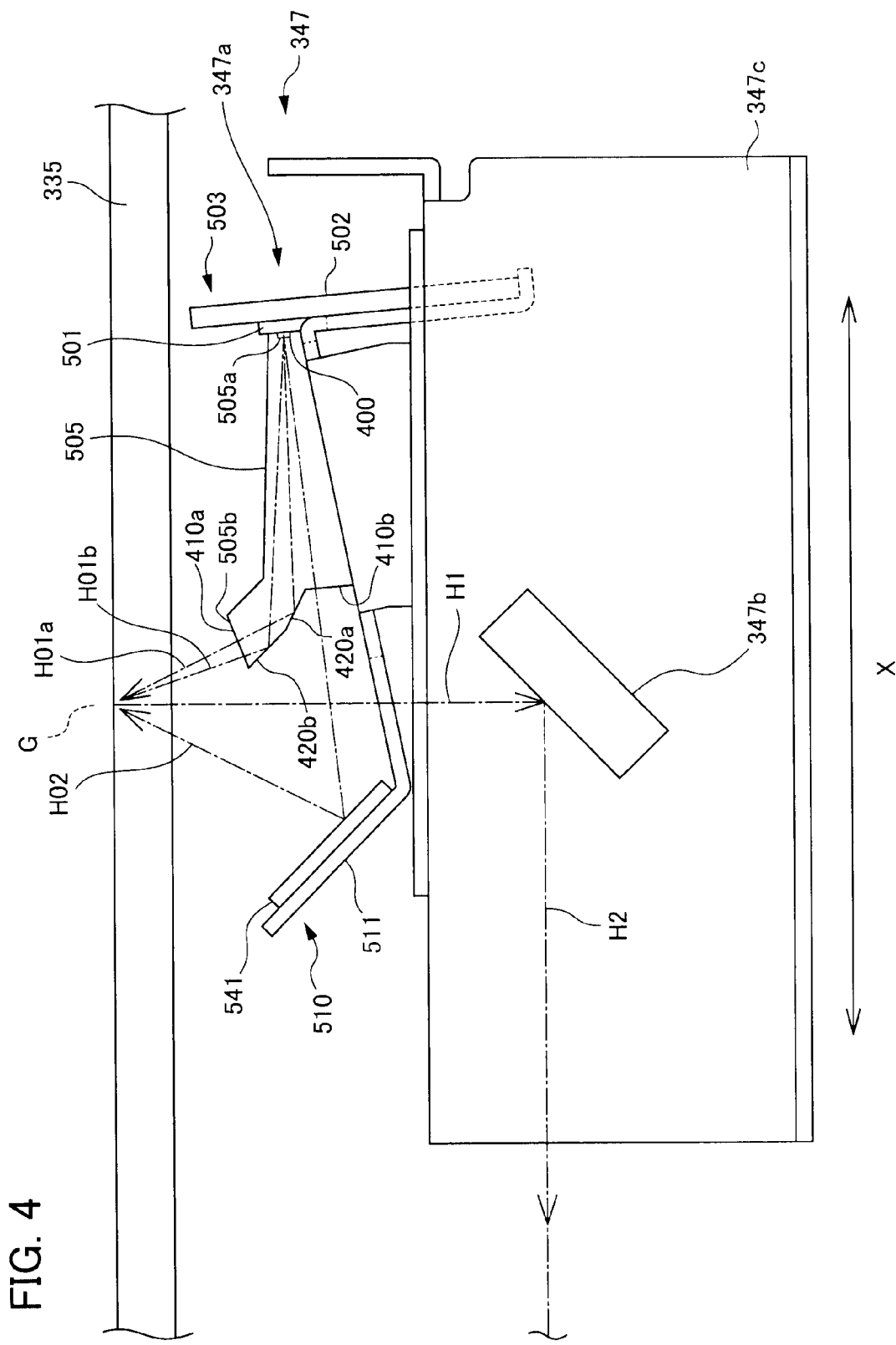
Figure 5:
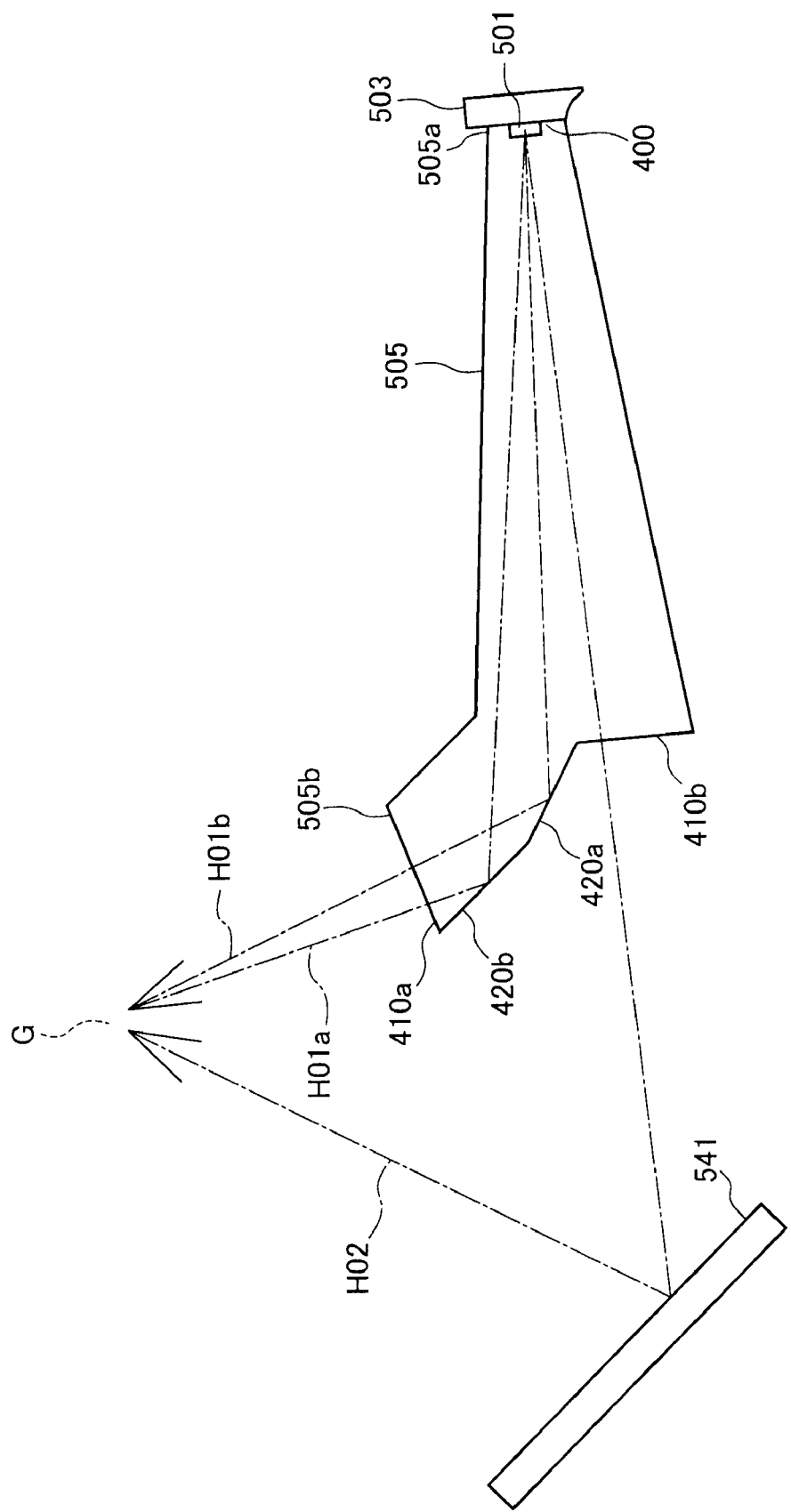
FIG. 5 is a partial enlarged view illustrating a light guiding body 505 in FIG. 4.
Figure 6:
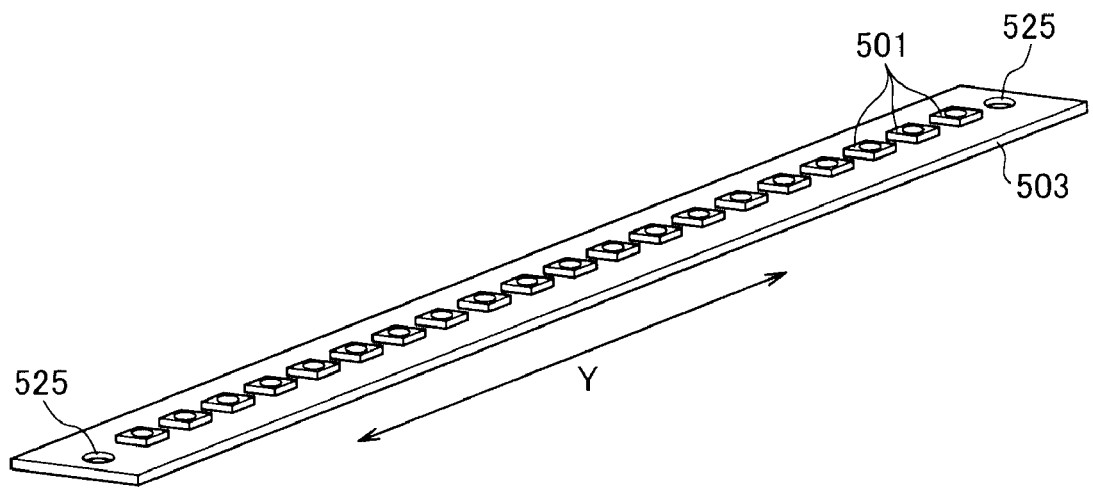
FIG. 6 is a perspective view illustrating an LED unit 503.

FIG. 2 is a schematic plan view of an internal configuration of the reader portion 301. FIG. 3 is a diagram of FIG. 2 viewed from a direction of an arrow S. It should be noted that FIG. 3 is a schematic view, accordingly omitting members shown in FIG. 2 for illustrative purposes. FIG. 4 is a cross-sectional view showing a configuration of the illumination portion 347a. FIG. 5 is a partial enlarged view illustrating a light guiding body 505 in FIG. 4. FIG. 6 is a perspective view illustrating an LED unit 503.

As shown in FIGS. 2 and 3, the reader portion 301 includes: a contact glass 335 on which the original G is placed; a pair of guide rails 345; a drive shaft 350 to which drive pulleys 351 are attached; a spindle 353 to which driven pulleys 352 are attached; an illumination unit 347 as the illumination portion; a mirror unit 349; an imaging lens 357; a CCD 358 as the reader portion; and an optical sensor 362.

As shown in FIG. 2, the reader portion 301 includes the contact glass 335 disposed on an upper face (on a front side of FIG. 2), on which the original G is placed. The contact glass 335 is disposed substantially in parallel to a horizontal plane in a case where the color copy machine 1 is disposed in a normal state.

As shown in FIG. 2, the pair of guide rails 345 is disposed between lateral faces 306a and 306b (on the left and the right in FIG. 2) of the reader portion 301. The pair of guide rails 345 is disposed in parallel with the abovementioned contact glass 335 (see FIG. 3). The illumination unit 347 and the mirror unit 349 are movably disposed on the pair of guide rails 345.

As shown in FIG. 2, the drive shaft 350 is disposed on a side to the lateral face 306a, so as to be orthogonal to the pair of guide rails 345. The drive shaft 350 is driven for normal and reverse rotation by a driving motor (not shown). The drive pulleys 351 each having a major diameter portion and a minor diameter portion are attached at both ends of the drive shaft 350, which is disposed more outward in the main scanning direction Y than the guide rails 345.

As shown in FIG. 2, the spindle 353 is disposed on a side to the lateral face 306b, so as to be orthogonal to the pair of guide rails 345. The driven pulleys 352 having the same diameter as the drive pulleys 351 are attached at both ends of the spindle 353, which is disposed more outward in the main scanning direction Y than the guide rails 345.

A driving wire 354a with a loop shape is wound on the major diameter portions of the drive pulley 351 and the driven pulley 352. Then, the illumination unit 347 is fixed to the driving wire 354a.

In addition, circular driving wires 354b is wound on the minor diameter portions of the drive pulleys 351 and the driven pulleys 352. Additionally, the mirror unit 349 is fixed to the driving wire 354b.

The circular driving wires 354a and 354b are rotated (in a direction of a loop) in accordance with rotation of the drive shaft 350 by the driving motor. As a result, the illumination unit 347 and the mirror unit 349 are moved in the sub-scanning direction X (in a horizontal direction of the drawing) along the pair of guide rails 345, in accordance with rotation of the circular driving wires 354a and 354b. Since a ratio of diameters between the major diameter portion and the minor diameter portion, in the drive pulley 351 and the driven pulley 352, is 2:1, a ratio of travel distance between the illumination unit 347 and the mirror unit 349 is also 2:1.

Here, two contacts 355 are provided on each portion of the illumination unit 347 and the mirror unit 349 contacting upper faces of the guide rails 345. The contacting surface of each of the contacts 355 with the guide rails 345 is made to be spherical. This allows for smooth movement of the illumination unit 347 and the mirror unit 349 in the sub-scanning direction X.

As shown in FIG. 2, an ISU base 356 as a supporting member is attached to a bottom face of the reader portion 301 on a side to the lateral face 306a. The imaging lens 357 and the CCD 358 as the reader portion are attached to an upper face of the ISU base 356 in a predetermined positional relationship.

As shown in FIG. 2, the imaging lens 357 is mounted on a lens supporting mount 359 that is fixed on the ISU base 356. The lens supporting mounting 359 is disposed so that a position thereof can be adjusted by a guiding member 360 disposed on a side to the CCD 358. The imaging lens 357 is disposed substantially in a center of the reader portion 301 in the sub-scanning direction X. The imaging lens 357 is disposed on a side to an end portion that is opposite to a side to the original G on the light path H (see FIG. 3). The imaging lens 357 forms an image in a predetermined position from the luminous flux H4 (see FIG. 3) incident thereon. In other words, the imaging lens 357 forms an image of the original G in the predetermined position.

As shown in FIG. 2, the CCD 358 is mounted on a CCD substrate 361 disposed on a back surface of the guiding member 360. The CCD 358 is disposed in an imaging position of the imaging lens 357. Luminous flux from the imaging lens 357 is incident on the CCD 358 via an open window 360a formed in the vicinity of a center of the guiding member 360. A light axis of the luminous flux incident upon the CCD 358 is compensated by fine-tuning the position of the guiding member 360.

The optical sensor 362 is disposed on the ISU base 356. The optical sensor 362 determines the size of the original G (in a horizontal direction in FIG. 2) based on whether a reflected light is received from the original G placed on the contact glass 335.

As shown in FIG. 3, the illumination unit 347 includes: an illumination portion 347a as the illumination portion; a first mirror 347b; and a first frame body 347c for housing the illumination portion 347a and the first mirror 347b.

The illumination portion 347a includes: a plurality of LEDs 501 as the plurality of luminescence portions; a light guiding body 505 disposed in the vicinity of or in contact with the plurality of LEDs 501 and having a first emission surface 410*a* and a second emission surface 410*b* (see FIGS. 4 and 5); and a reflection mirror 541 that irradiates light from the second emission surface 410*b* onto an original. The illumination portion 347*a* is described later in detail.

The first mirror 347*b* is disposed on a lower side of the illumination unit 347 in a thickness direction Z. The first mirror 347*b* is disposed so as to direct a reflective surface thereof toward the original G and the second mirror 349*a*. The first mirror 347*b* reflects the luminous flux H1 from the original G to direct the luminous flux H1 toward the second mirror 349*a*.

The first frame body 347*c* houses the illumination portion 347*a* and the first mirror 347*b*. The first frame body 347*c* is fixed to the driving wire 354*a* (see FIG. 2) wound on the major diameter portions of the drive pulley 351 and the driven pulley 352 (see FIG. 2). The first frame body 347*c* is moved in the sub-scanning direction X along the pair of guide rails 345, in accordance with rotation of the driving wires 354*a* and 354*b*.

As shown in FIG. 3, the mirror unit 349 includes: a second mirror 349*a*; a third mirror 349*b*; and a second frame body 349*c* for housing the second mirror 349*a* and the third mirror 349*b*.

The second mirror 349*a* is disposed on an upper side of the second frame body 349*c* in a thickness direction Z. The second mirror 349*a* is disposed so as to direct a reflective surface thereof toward the first mirror 347*b* and the third mirror 349*b*. The second mirror 349*a* reflects a luminous flux H2 from the first mirror 347*b* to direct the luminous flux H2 toward the third mirror 349*b*.

The third mirror 349*b* is disposed on a lower side of the second frame body 349*c* in a thickness direction Z. The third mirror 349*b* is disposed so as to direct a reflective surface thereof toward the second mirror 349*a* and the imaging lens 357. The third mirror 349*b* reflects a luminous flux H3 from the second mirror 349*a* to direct the luminous flux H3 toward the imaging lens 357.

The first mirror 347*b*, the second mirror 349*a*, and the third mirror 349*b* form a light path H so that the light from the original G is incident on the imaging lens 357. As described above, since the illumination unit 347 moves in the sub-scanning direction X at a speed A while the mirror unit 349 moves in the sub-scanning direction X at a speed A/2, the length of the light path H is kept constant even while reading an image.

Here, the illumination portion 347*a* is described in detail with reference to FIGS. 4 to 6.

As shown in FIG. 4, the illumination portion 347*a* includes: an LED unit 503 to which a plurality of LEDs 501 is attached; the light guiding body 505 having the first emission surface 410*a* and the second emission surface 410*b*; the reflection mirror 541 that irradiates light from the second emission surface 410*b* onto an original; and an attaching member 510 to which the LED unit 503, the light guiding body 505, and the reflection mirror 541 are attached.

As shown in FIG. 6, the plurality of LEDs 501 is respectively attached to the plate-like member 502 with spaces therebetween. The plurality of LEDs 501 is respectively arranged in the main scanning direction Y at regular intervals. The plurality of LEDs 501 is respectively attached to the metallic attaching member 510 of high rigidity (see FIG. 4) via the plate-like member 502. Each of the plurality of LEDs 501 emits light for irradiating the original G.

As shown in FIGS. 4 and 5, the light guiding body 505 is disposed so that a first end 505*a* faces the LED unit 503 to which the plurality of LEDs 501 is attached and a second end 505*b* faces the contact glass 335. The light guiding body 505 has a light incidence portion 400 formed on a side to the first end 505*a*, and the first emission surface 410*a* and the second emission surface 410*b* constituting a light emission portion formed on a side to the second end 505*b*. In addition, the light guiding body 505 has a first reflective surface 420*a* and a second reflective surface 420*b* that are formed thereinside, which reflect light that is incident upon the light incidence portion 400 and emit the light from the first emission surface 410*a*.

The light incidence portion 400 is disposed to face the plurality of LEDs 501. In the present embodiment, the light incidence portion 400 is disposed to fit onto the plurality of LEDs 501. Light from the plurality of LEDs 501 is incident upon the light incidence portion 400 toward the inside of the light guiding body 505.

The first emission surface 410*a* is disposed to face the original G. The first emission surface 410*a* emits light, which is incident upon the light incidence portion 400, toward the original. More specifically, the first emission surface 410*a* emits light that is incident upon the light incidence portion 400 and reflected by the first reflective surface 420*a* or the second reflective surface 420*b*.

The first reflective surface 420*a* and the second reflective surface 420*b* are formed so as to be at a predetermined angle with respect to each other and to be continuous with each other. The first reflective surface 420*a* and the second reflective surface 420*b* are formed on a side facing the plurality of LEDs 501, in a portion where the second emission surface 410*b* is not formed. Here, light directed toward the first emission surface 410*a*, which is a portion of the light incident upon the light incidence portion 400, is reflected by the first reflective surface 420*a* or the second reflective surface 420*b* toward the original G. In other words, light H01*a* and H01*b* emitted from the first emission surface 410*a* are condensed by the first reflective surface 420*a* and the second reflective surface 420*b*, and emitted toward the original G.

The second emission surface 410*b* is disposed so as to face the reflection mirror 541 as the reflective member. The second emission surface 410*b* emits light, which is incident upon the light incidence portion 400, toward the reflection mirror 541. The light emitted from the second emission surface 410*b* is reflected by the reflection mirror 541 toward the original G. The light H02 being reflected by the reflection mirror 541 is irradiated onto the original G from a side different from the light H01*a* and H01*b* emitted from the first emission surface 410*a*.

The light guiding body 505 has two emission surfaces: the first emission surface 410*a*; and the second emission surface 410*b*. The first emission surface 410*a* and the second emission surface 410*b* are formed at a predetermined angle with respect to each other. The first emission surface 410*a* and the second emission surface 410*b* are formed in a positional relationship such that the two surfaces are not flush with each other and not parallel to each other. In addition, the first emission surface 410*a* and the second emission surface 410*b* are formed to be spaced apart from each other. This allows the light guiding body 505 to emit light from one light source in completely different directions.

The light guiding body 505 guides light, which is incident upon the light incidence portion 400, towards the original G and the reflection mirror 541, while suppressing unnecessary diffusion.

As shown in FIG. 4, the reflection mirror 541 as the reflective member is mounted on a mirror mount 511 on the attaching member 510. The reflection mirror 541 is disposed so as to direct a reflective surface thereof toward the second emission surface 410b and the original G. The reflection mirror 541 is disposed on the other side of the light guiding body 505 in the sub-scanning direction X across the luminous flux Hi. The reflection mirror 541 reflects light emitted from the second emission surface 410b toward the original G. In other words, the reflection mirror 541 reflects a portion of the light, which is incident upon the light incidence portion 400 and not emitted from the first emission surface 410a, and irradiates the original G therewith.

As described above, the light H01a and H01b being emitted from the first emission surface 410a is irradiated onto the original G from a first side in the sub-scanning direction X. On the other hand, the light being emitted from the second emission surface 410b is reflected by the reflection mirror 541 and irradiated onto the original G from a second side in the sub-scanning direction X. The light H01a and H01b, and the light H02 are irradiated onto the original G from the first side and the second side in the sub-scanning direction, respectively.

As shown in FIG. 4, the attaching member 510 is disposed on an upper side (upper side in FIG. 4) in the first frame body 347c. The LED unit 503, the light guiding body 505, and the reflective mirror 541 are attached to the attaching member 510. The plurality of LEDs 501 is attached to the attaching member 510 via the LED unit 503.

Next, operations in the image reading device 300 according to the present embodiment are described hereinafter. First, the original feeder portion 70 (see FIG. 1) is made to be in an open state and the original G is placed on a second reading surface 304A (see FIG. 3) constituting the reading surface 302A (see FIG. 2). The illumination unit 347 and the mirror unit 349 (see FIG. 3) are brought to the second position 304 (see FIG. 3) as the optical sensor 362 (see FIG. 3) detects that the original G is placed on the second reading surface 304A.

Subsequently, the original feeder portion 70 is made to be in a closed state. When a start switch (not shown) is pressed, the color copy machine 1 is instructed to copy an image of the original G. When a start switch (not shown) is pressed, the image reading device 300 starts an operation of reading the image of the original G.

More specifically, first, the plurality of LEDs 501 (see FIGS. 3 and 4) is turned on. Light from the plurality of LEDs 501 being turned on is incident upon the light incidence portion 400 toward the inside of the light guiding body 505. A portion of the light incident upon the light incidence portion 400 is reflected by the first reflective surface 420a or the second reflective surface 420b, condensed, and emitted from the first emission surface 410a. The light H01a and H01b being emitted from the first emission surface 410a are directed toward the original G, and directly irradiated onto the original G.

In addition, a portion of the light incident upon the light incidence portion 400 is emitted from the second emission surface 410b. The light emitted from the second emission surface 410b is reflected by the reflection mirror 541 toward the original G, and indirectly irradiated onto the original G.

The light guiding body 505 thus can emit light, which is incident upon the single light incidence portion 400, in two completely different directions (to two completely different objects). The light H01a and H01b emitted from the first emission surface 410a are incident from a lower side in a vertical direction and the first side in the sub-scanning direction X, and the light H02 emitted from the second emission surface 410b is incident from a lower side in a vertical direction and the second side in the sub-scanning direction X, upon the original G. The original G is irradiated with line-like light that extends in the main scanning direction Y The illumination unit 347 and the mirror unit 349 are moved in the sub-scanning direction X while irradiating light onto the original G. The illumination unit 347 and the mirror unit 349 are moved while maintaining a length of the light path H constant.

A luminous flux from the original G is incident upon the imaging lens 357 after being reflected by the first mirror 347b, the second mirror 349a, and the third mirror 349b (see FIG. 3).

The imaging lens 357 forms an image of the original G. The CCD 358 disposed in the imaging position reads the image of the original G as image data, based on the image formed on the CCD 358 via the open window 360a of the guiding member 360 (see FIG. 3).

Here, since the original G is irradiated with light emitted by the light guiding body 505 from the first and the second sides in the sub-scanning direction X, generation of an edge shadow on an image being read can be suppressed (see FIGS. 3 and 4).

The image information read by the CCD 358 is output to the CCD substrate 361. The image information being output to the CCD substrate 361 is then output to the device main body M via a predetermined circuit substrate (see FIG. 3).

The image information being input is input to an image forming control unit (not shown) in the device main body M. The image forming control unit controls the photoreceptor drum 2 as the image supporting body, the charging portion 10, the laser scanner unit 4, the developing unit 16 and the like constituting the image forming portion, based on the image information. A predetermined toner image is formed on the photoreceptor drum 2 based on the image information (see FIG. 1).

An image similar to the image of the original G is transferred to the paper T, which is conveyed to the transfer nip N formed by the photoreceptor drum 2, based on the image information. The paper T, on which the image is formed, is ejected from the ejecting portion 50 to the outside of the device main body M (see FIG. 1).

According to the present embodiment, since the light guiding body 505 has the first emission surface 410a and the second emission surface 410b, which is formed on a different plane from a plane including the first emission surface 410a, light from a single light source can be emitted toward different objects. In addition, since the first emission surface 410a and the second emission surface 410b are formed at a predetermined angle with respect to each other, light from a single light source can be emitted at different angles. Furthermore, since the first emission surface 410a and the second emission surface 410b are formed to be spaced apart from each other, light from a single light source can be emitted toward objects that are spaced apart from each other.

In addition, according to the present embodiment, since the light guiding body 505 has the first reflective surface 420a that reflects light from the light incidence portion 400 and emits from the first emission surface 410a, and the second reflective surface 420b that is formed at a predetermined angle with respect to, and to be continuous with, the first reflective surface 420a, light condensed toward the original G can be irradiated.

Furthermore, according to the present embodiment, since the reflective mirror 541 that is disposed so as to face the second emission surface 410b and reflects light from the second emission surface 410b toward the original G is provided, the generation of an edge shadow on an image being read can be suppressed.

According to the present embodiment, the number of components can be reduced while reducing the size of the image reading device.

Moreover, according to the present embodiment, a color copy machine 1 including an image reading device providing the above effects can be provided. The color copy machine 1 can also provide similar effects as in the abovementioned image reading device 300.

Figure 7:
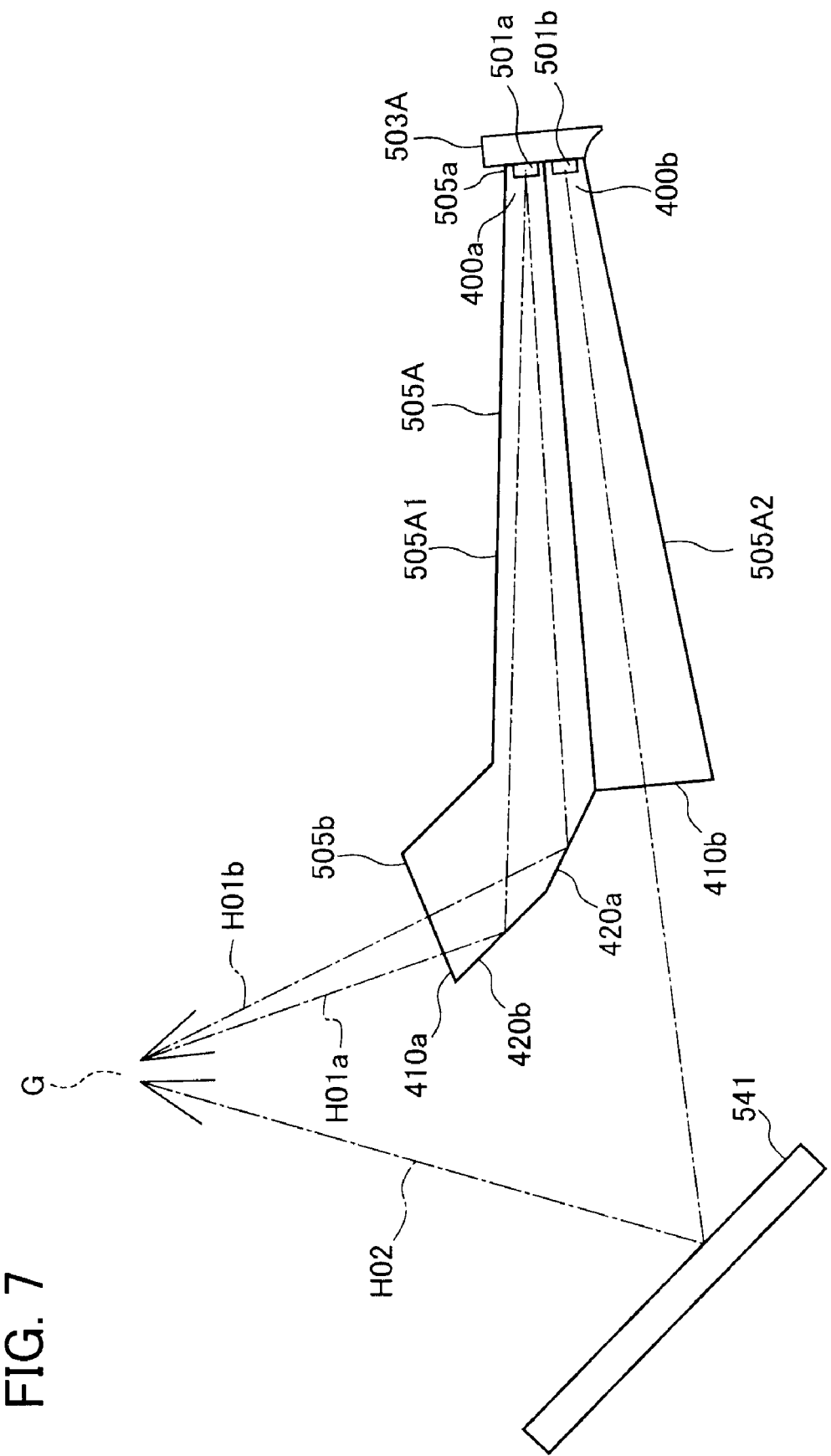
FIG. 7 is a diagram illustrating a light guiding body 505A.
Figure 8:
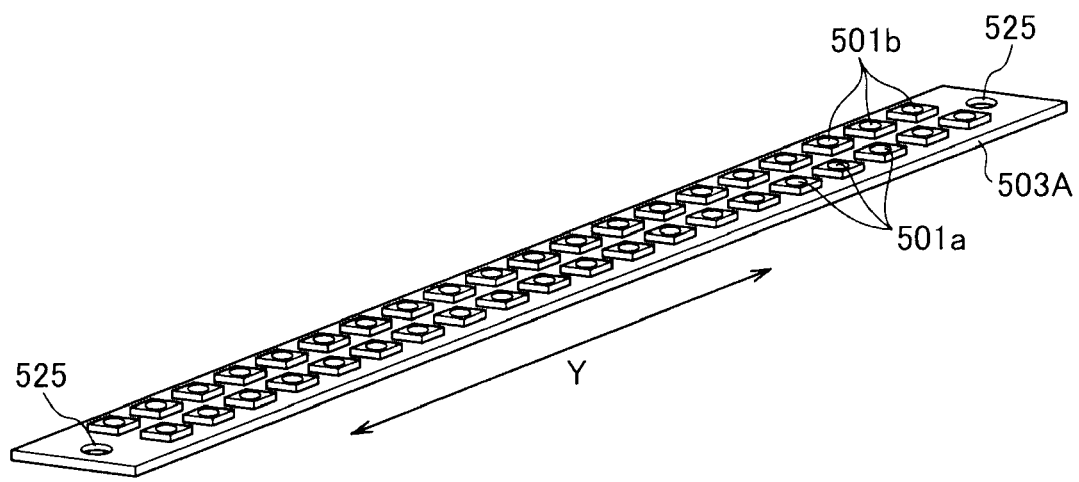
FIG. 8 is a perspective view illustrating an LED unit 503A.
Figure 9:
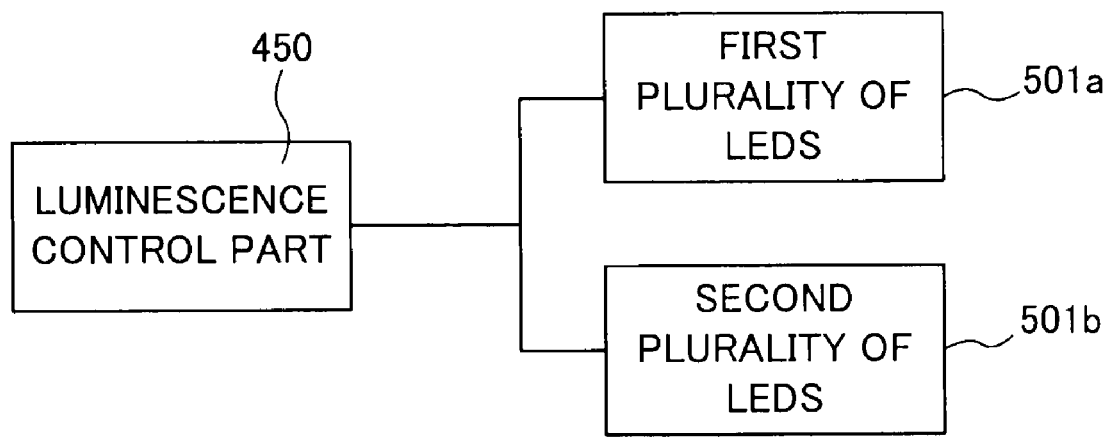
FIG. 9 is a block diagram including a luminescence control part 450 that controls luminescence of the LED unit 503A.

Next, a color copy machine according to a second embodiment of the present invention is described with reference to FIGS. 7 to 9. FIG. 7 is a diagram illustrating a light guiding body 505A. FIG. 8 is a perspective view illustrating an LED unit 503A. FIG. 9 is a block diagram including a luminescence control part 450 that controls luminescence of the LED unit 503A. Here, the color copy machine according to the second embodiment has a similar configuration to that of the color copy machine 1 according to the first embodiment, except for the light guiding body 505A. Hereinafter, only the light guiding body 505A, which differs from the color copy machine 1, is described, and descriptions of other components are omitted.

As shown in FIG. 7, the light guiding body 505A is disposed so that a first end 505a faces the LED unit 503A to which the plurality of LEDs 501 a and 501b is attached and a second end 505b faces the contact glass 335 (see FIG. 3).

Here, as shown in FIG. 8, the LED unit 503A according to the present embodiment includes a first plurality of LEDs 501a that is disposed linearly at predetermined intervals in the main scanning direction Y and a second plurality of LEDs 501b that is disposed alongside of the first plurality of LEDs 501 a in the sub scanning direction X and linearly at predetermined intervals in the main scanning direction Y The light guiding body 505A includes a first light guiding body 505A1 and a second light guiding body 505A2. The light guiding body 505A is formed by bonding the first light guiding body 505A1 with a second light guiding body 505A2. The appearance of the light guiding body 505A, which is formed by bonding the first light guiding body 505A1 with a second light guiding body 505A2, is substantially identical to the light guiding body 505 of the first embodiment.

The first light guiding body 505A1 has a first light incidence portion 400a and a first emission surface 410a. In addition, the first light guiding body 505A1 has a first reflective surface 420a and a second reflective surface 420b that are formed thereinside, and reflect light that is incident upon the first light incidence portion 400a and emit the light from the first emission surface 410a.

The first light incidence portion 400a is disposed to face the first plurality of LEDs 501a. In the present embodiment, the first light incidence portion 400a is disposed to fit onto the first plurality of LEDs 501a. Light from the first plurality of LEDs 501a is incident upon the first light incidence portion 400a toward the inside of the first light guiding body 505A1.

The first emission surface 410a is disposed to face the original G. The first emission surface 410a emits light, which is incident upon the first light incidence portion 400a, toward the original G. More specifically, the first emission surface 410a emits light that is incident upon the first light incidence portion 400a and reflected by the first reflective surface 420a or the second reflective surface 420b.

The first reflective surface 420a and the second reflective surface 420b are formed so as to be at a predetermined angle with respect to each other and to be continuous with each other. The first reflective surface 420a and the second reflective surface 420b are disposed to face the first plurality of LEDs 501a. Light incident upon the first light incidence portion 400a is reflected by the first reflective surface 420a or the second reflective surface 420b toward the original G. In other words, light H01a and H01b emitted from the first emission surface 410a are condensed by the first reflective surface 420a and the second reflective surface 420b, and emitted toward the original G.

The second light guiding body 505A2 has a second light incidence portion 400b and a second emission surface 410b.

The second light incidence portion 400b is disposed to face the second plurality of LEDs 501b. In the present embodiment, the second light incidence portion 400b is disposed to fit onto the second plurality of LEDs 501b. Light from the second plurality of LEDs 501b is incident upon the second light incidence portion 400b toward the inside of the second light guiding body 505A2.

The second emission surface 410b is disposed so as to face the reflection mirror 541 as a reflective surface member. The second emission surface 410b emits light, which is incident upon the second light incidence portion 400b, toward the reflection mirror 541. The light emitted from the second emission surface 410b is reflected by the reflection mirror 541 toward the original G. The light H02 being reflected by the reflection mirror 541 is irradiated onto the original G from a side different from the light H01a and H01b emitted from the first emission surface 410a.

The light guiding body 505A has two emission surfaces: the first emission surface 410a; and the second emission surface 410b. The first emission surface 410a and the second emission surface 410b is formed at a predetermined angle with respect to each other. The first emission surface 410a and the second emission surface 410b are formed in a positional relationship such that the two surfaces are not flush with each other and not parallel to each other. In addition, the first emission surface 410a and the second emission surface 410b are formed to be spaced apart from each other. This allows the light guiding body 505 to emit light from one light source in completely different directions.

The intensity of light incident upon the light incidence portions 400a and 400b can be adjusted by the size of the light incidence portions 400a and 400b (for example, opening area thereof), in addition to the following adjustment.

As shown in FIG. 9, the image reading device according to the present embodiment is provided with the luminescence control part 450 that respectively controls luminescence of the first plurality of LEDs 501a that is disposed linearly in the main scanning direction Y and of the second plurality of LEDs 501 that is disposed linearly in the main scanning direction Y.

The luminescence control part 450 can control the first plurality of LEDs 501a that is disposed linearly in the main scanning direction Y and the second plurality of LEDs 501b that is disposed linearly in the main scanning direction Y so that either one of the two does not emit light.

The luminescence control part 450 can also respectively control an amount of luminescence of the first plurality of LEDs 501a that is disposed linearly in the main scanning direction Y and of the second plurality of LEDs 501b that is disposed linearly in the main scanning direction Y. For example, the amount of luminescence thereof can be adjusted according to a speed of reading in the image reading device, thickness of the original G and the like. Here, the amount of luminescence can be controlled by adjusting supply voltage for the first plurality of LEDs 501a and for the second plurality of LEDs 501b.

The present embodiment can provide the following effects, in addition to the effects of the first embodiment.

According to the present embodiment, since the light guiding body 505A is composed of the first light guiding body 505A1 and the second light guiding body 505A2, an amount of light incident onto and emitted from the light guiding body 505A can be adjusted. In addition, unnecessary diffusion of light can be further suppressed when the light is guided toward the original.

Furthermore, according to the present embodiment, since the light guiding body 505A has the first light incidence portion 400a and the second light incidence portion 400b, the amount of light incident thereonto can be adjusted with a high degree of accuracy with a simple configuration.

Moreover, according to the present embodiment, since the LED unit 503A includes the first plurality of LEDs 501a that is disposed linearly in the main scanning direction Y and the second plurality of LEDs 501b that is disposed linearly in the main scanning direction Y, the amount of light incident onto the first light guiding body 505A1 and the amount of light incident onto the second light guiding body 505A2 can be adjusted.

The first and the second embodiments have been described above as preferred embodiments of the present invention; however, the present invention is not limited thereto and can be carried out in various modes. For example, the copy machine 1 is exemplified in the present embodiment as an image forming apparatus; however, the present invention is not limited thereto and can be a black and white copy machine, a printer, a facsimile machine and a multi-functional printer having functions thereof.

In addition, the image reading device 300 is formed to be integrated with the device main body M in the first and the second embodiments; however, the present invention is not limited thereto, and the image reading device can be configured with a housing other than the device main body M. For example, the image reading device 300 can be configured to be removable with respect to the device main body M.

Furthermore, although the image reading device 300 constitutes a portion of the color copy machine 1 as the image forming apparatus in the first and the second embodiments, the present invention is not limited thereto, and the image reading device 200 can be a stand-alone device such as an image scanner.

Moreover, in the first and the second embodiments, the LED 501 is described as the illumination portion; however, the present invention is not limited thereto. For example, devices using organic EL (organic electro-luminescence) and optical fiber, and various lamps can also be used as the illumination portion.

What is claimed is:

1. An image reading device comprising:
    an illumination portion that irradiates light onto an original, including:
    a luminescence portion composed of at least one of: a plurality of dot-shaped luminescence members that is disposed at predetermined intervals in a main scanning direction; and an elongated luminescence member that is formed to extend in the main scanning direction;
    a light guiding body that is disposed between the luminescence portion and the original, including:
    a light incidence portion disposed on a side of the luminescence portion, and
    a light emission portion including a first emission surface disposed on a side to the original and a second emission surface formed on a different plane from a plane including the first emission surface;
    at least one mirror that forms a light path by reflecting a luminous flux from the original;
    an imaging lens that forms an image from the luminous flux reflected by the at least one mirror; and
    a reading portion that is disposed in an imaging position of the imaging lens, and reads an image of the original based on image formation by the imaging lens
    wherein the light guiding body comprises:
    a first light guiding body that includes the first emission surface; and
    a second light guiding body that includes the second emission surface.

2. The image reading device according to claim 1, wherein the second emission surface is formed so as to make a predetermined angle with respect to the first emission surface.

3. The image reading device according to claim 1, wherein the first emission surface and the second emission surface are formed to be mutually spaced apart.

4. The image reading device according to claim 1, wherein:
    the light guiding body includes a reflective portion formed thereinside, which reflects light from the light incidence portion and emits the light through the first emission surface; and
    the reflective portion includes a first reflective surface and a second reflective surface that is formed so as to make a predetermined angle with respect to, and to be continuous with, the first reflective surface.

5. The image reading device according to claim 1, further comprising a reflective member that is disposed to face the second emission surface and reflects light from the second emission surface toward a side of the original.

6. The image reading device according to claim 1, wherein:
    the first light guiding body includes a first light incidence portion that is disposed to face the luminescence portion;
    the second light guiding body includes a second light incidence portion that is disposed to face the luminescence portion; and
    a size of the first light incidence portion and the second light incidence portion is set in accordance with an intensity of light emitted from the first emission surface and the second emission surface, respectively.

7. The image reading device according to claim 6, wherein the luminescence portion includes
    a first luminescence portion that is disposed to face the first light incidence portion, and is composed of the dot-shaped luminescence members disposed at predetermined intervals along the main scanning direction; and
    a second luminescence portion that is disposed to face the second light incidence portion, and composed of the dot-shaped luminescence members aligned along a sub-scanning direction of the first luminescence portion and disposed at predetermined intervals in the main scanning direction.

8. The image reading device according to claim 7, further comprising a luminescence control part that controls luminescence in the first luminescence portion and in the second luminescence portion independently.

9. An image forming apparatus comprising:
    an image reading device that includes an image reading device having an illumination portion that irradiates light onto an original, including
    a luminescence portion composed of at least one of: a plurality of dot-shaped luminescence members that is disposed at predetermined intervals in a main scanning direction; and an elongated luminescence member that is formed to extend in the main scanning direction, and
    a light guiding body that is disposed between the luminescence portion and the original, having:
    a light incidence portion disposed on a side of the luminescence portion, and a light emission portion including a first emission surface disposed on a side to the original and a second emission surface formed on a different plane from a plane including the first emission surface, at least one mirror that forms a light path by reflecting a luminous flux from the original;

an imaging lens that forms an image from the luminous flux reflected by the at least one mirror, and a reading portion that is disposed in an imaging position of the imaging lens, and reads an image of the original based on image formation by the imaging lens;

an image supporting body on which an electrostatic latent image is formed on a surface thereof based on image information relating to an image of the original that is read by the image reading device;

a developing unit that develops a toner image on the electrostatic latent image formed on the image supporting body;

a transfer portion that directly or indirectly transfers the toner image formed on the image supporting body to a predetermined paper; and a fixing portion that fixes the toner image transferred to the predetermined paper by the transfer portion;

wherein the light guiding body comprises:

a first light guiding body that includes the first emission surface; and a second light guiding body that includes the second emission surface.

10. The image forming apparatus according to claim 9, wherein the second emission surface is formed so as to make a predetermined angle with respect to the first emission surface.

11. The image forming apparatus according to claim 9, wherein the first emission surface and the second emission surface are formed to be mutually spaced apart.

12. The image forming apparatus according to claim 9, wherein:

the light guiding body includes a reflective portion formed thereinside, which reflects light from the light incidence portion and emits the light through the first emission surface; and the reflective portion includes a first reflective surface and a second reflective surface that is formed so as to make a predetermined angle with respect to, and to be continuous with, the first reflective surface.

13. The image forming apparatus according to claim 9, further comprising a reflective member that is disposed to face the second emission surface and reflects light from the second emission surface toward a side of the original.

14. The image forming apparatus according to claim 9, wherein:

the first light guiding body includes a first light incidence portion that is disposed to face the luminescence portion;

the second light guiding body includes a second light incidence portion that is disposed to face the luminescence portion; and a size of the first light incidence portion and the second light incidence portion is set in accordance with an intensity of light emitted from the first emission surface and the second emission surface, respectively.

15. The image forming apparatus according to claim 14, wherein the luminescence portion includes:

a first luminescence portion that is disposed to face the first light incidence portion, and is composed of the dot-shaped luminescence members disposed at predetermined intervals along the main scanning direction; and a second luminescence portion that is disposed to face the second light incidence portion, and is composed of the dot-shaped luminescence members aligned along a sub-scanning direction of the first luminescence portion and disposed at predetermined intervals in the main scanning direction.

16. The image forming apparatus according to claim 15, further comprising a luminescence control part that controls luminescence in the first luminescence portion and in the second luminescence portion independently.

17. An image reading device comprising:

an illumination portion that irradiates light onto an original, including:

a luminescence portion composed of at least one of: a plurality of dot-shaped luminescence members that is disposed at predetermined intervals in a main scanning direction; and an elongated luminescence member that is formed to extend in the main scanning direction;

a light guiding body that is disposed between the luminescence portion and the original, including:

a light incidence portion disposed on a side of the luminescence portion;

a light emission portion including a first emission surface disposed on a side to the original and a second emission surface;

a first light guiding body that includes the first emission surface;

a second light guiding body that includes the second emission surface;

at least one mirror that forms a light path by reflecting a luminous flux from the original;

an imaging lens that forms an image from the luminous flux reflected by the at least one mirror; and a reading portion that is disposed in an imaging position of the imaging lens, and reads an image of the original based on image formation by the imaging lens.

18. An image forming apparatus comprising:

an image reading device that includes an image reading device having an illumination portion that irradiates light onto an original, including a luminescence portion composed of at least one of: a plurality of dot-shaped luminescence members that is disposed at predetermined intervals in a main scanning direction; and an elongated luminescence member that is formed to extend in the main scanning direction, and a light guiding body that is disposed between the luminescence portion and the original, including:

a light incidence portion disposed on a side of the luminescence portion;

a light emission portion including a first emission surface disposed on a side to the original and a second emission surface;

a first light guiding body that includes the first emission surface;

a second light guiding body that includes the second emission surface;

at least one mirror that forms a light path by reflecting a luminous flux from the original;

an imaging lens that forms an image from the luminous flux reflected by the at least one mirror, and a reading portion that is disposed in an imaging position of the imaging lens, and reads an image of the original based on image formation by the imaging lens;

an image supporting body on which an electrostatic latent image is formed on a surface thereof based on image information relating to an image of the original that is read by the image reading device;

a developing unit that develops a toner image on the electrostatic latent image formed on the image supporting body;

a transfer portion that directly or indirectly transfers the toner image formed on the image supporting body to a predetermined paper; and a fixing portion that fixes the toner image transferred to the predetermined paper by the transfer portion.

* * * * *